United States Patent [19]

Freeland

[11] Patent Number: 5,277,166

[45] Date of Patent: Jan. 11, 1994

[54] APPARATUS FOR CONTROLLING THE RATE OF COMPOSITION CHANGE OF A FLUID

[75] Inventor: Mark Freeland, Farmington Hills, Mich.

[73] Assignee: Ford Motor Company, Dearborn, Mich.

[21] Appl. No.: 933,838

[22] Filed: Aug. 24, 1992

[51] Int. Cl.⁵ .......................................... F02M 37/04
[52] U.S. Cl. .................... 123/510; 137/572; 123/514; 123/518
[58] Field of Search ............... 123/514, 510, 516, 1 A; 123/509, 575, 578, 527, 276 E, 137/571, 572, 567

[56] References Cited

U.S. PATENT DOCUMENTS

| | | | |
|---|---|---|---|
| 1,203,578 | 11/1916 | Brooks . | |
| 3,390,698 | 7/1968 | Carmichael et al. | 137/567 |
| 3,771,690 | 11/1973 | Hunter | 123/518 |
| 4,175,527 | 11/1979 | Sanada | 123/518 |
| 4,230,569 | 10/1980 | Lohrberg et al. | 210/754 |
| 4,533,123 | 8/1985 | O'Leary | 261/61 |
| 4,546,750 | 10/1985 | Brunell et al. | 123/514 |
| 4,706,630 | 11/1987 | Wineland et al. | 123/478 |
| 4,763,633 | 8/1988 | Nakanishi | 123/514 |
| 4,930,537 | 6/1990 | Farmer | 123/514 |
| 4,979,482 | 12/1990 | Bartlett | 123/509 |
| 4,993,391 | 12/1991 | Kuribara | 123/497 |
| 5,044,344 | 9/1991 | Tuckey | 123/497 |

FOREIGN PATENT DOCUMENTS

| | | |
|---|---|---|
| 1217756 | 5/1966 | Fed. Rep. of Germany . |
| 2844057 | 4/1980 | Fed. Rep. of Germany ...... 123/509 |
| 0159558 | 12/1981 | Japan ................................. 123/509 |
| 1530231 | 11/1987 | U.S.S.R. . |

*Primary Examiner*—Carl S. Miller
*Attorney, Agent, or Firm*—Roger L. May; Peter Abolins

[57] ABSTRACT

A reservoir in which fluid entering the reservoir is mixed with fluid already present in the reservoir is provided. The mixed fluid is then drawn from the reservoir in such a manner that the fluid drawn from the reservoir has a composition which closely approximates the average composition of the fluid in the reservoir. In this manner, the rate of composition change of fluid released from the reservoir is less than the rate of compositional change of fluid entering the reservoir.

18 Claims, 4 Drawing Sheets

FIG-1

APPARATUS FOR CONTROLLING THE RATE OF COMPOSITION CHANGE OF A FLUID

BACKGROUND OF THE INVENTION

The present invention relates to an apparatus and method for controlling the rate of composition change of a fluid having a changing composition. More particularly, it relates to an apparatus and method for controlling the rate of composition change of fuel in a vehicle capable of using fuels of differing composition.

It is well known that ever tighter emissions regulations and petroleum depletion have prompted research into the feasibility of using alternative fuels in motorized vehicle engines. Currently, ethanol/gasoline and methanol/gasoline mixtures are among the alternative fuel possibilities being considered.

Alternative fuel mixtures exhibit physical properties and performance characteristics which are different from pure gasoline, including dissimilar combustion burn rates, volumetric energy content, vapor pressures, octane ratings, and heats of vaporization. The operating parameters of vehicle engines utilizing alternative fuels must be adjusted to accommodate such differences in order for the engines to operate efficiently. The operating parameters which must be adjusted include the air bypass, fuel flow, spark timing, and air/fuel ratio.

The aforementioned adjustments can be made automatically by an engine control computer. Engine control computers are well known and are commonly used in vehicles. See, for example, U.S. Pat. No. 4,706,630 to Wineland et al. However, in order for an engine control computer to correctly make the requisite adjustments, the instantaneous composition of the fuel being burned in the engine must be known by the computer. To the extent that fuel composition information sent to the engine control computer differs from the actual composition of fuel being burned in the engine, adjustments made to the engine will be improper. Improper engine adjustments, in turn, can result in poor engine performance and excess emissions due to incomplete combustion. Thus, a close correlation between the composition of fuel actually being burned in an engine and that which is made known to the engine control computer is needed to facilitate the use of alternative fuel use in motorized vehicle engines.

A common method of providing fuel composition information to engine control computers is through the use of in-line fuel sensors which exploit differences in physical properties between gasoline and ethanol or methanol to measure the instantaneous composition of fuel flowing past the sensor. The sensor then sends a signal to the computer which corresponds to the composition of the fuel flowing past the sensor.

A frequently encountered problem with alternative fuel vehicles is rapid composition change of the fuel flowing from the fuel tank to the engine. The fuel in alternative fuel vehicles will typically consist of multiple components, such as combinations of gasoline, methanol and ethanol. In addition, the fuel may also contain various fuel additives or water. Prior to the complete mixing of the fuel by the fuel pump as it circulates fuel through the fuel system, "pockets" of fuel having varying compositions will flow in the fuel line towards the engine, thus introducing rapidly and continuously varying compositions of fuel to the engine. As will be explained, engine control systems cannot adequately cope with such rapid composition changes. The rate of fuel composition change is particularly severe when phase separation occurs or when the fuel tank is nearly empty and a different blend is added.

Phase separation in the fuel tank and in the fuel system occurs when the weather is cold and/or the water content of the fuel blend is above its threshold of tolerance for the current temperature. In this instance, when the vehicle's engine is not running such that the fuel is not flowing but is stationary in the fuel tank and fuel system, the fuel will separate into two or more immiscible phases. The higher density methanol rich, ethanol rich, or water rich phase will settle towards the lower portions of the fuel tank and fuel system while the lower density gasoline rich phase will accumulate towards the upper portions of the fuel tank and fuel system. When the engine is subsequently started and the fuel pump resumes circulating fuel through the fuel system, the phase separated mixture will form an emulsion as it begins to mix. Prior to forming an emulsion, the composition of the fuel being sent to the engine changes very rapidly. After the emulsion forms, the rate of composition change slows but is still higher than the rate at which engine control systems can adequately control the performance of the engine due to inadequate mixing of the emulsion.

Another situation in which a high rate of compositional change is encountered is when a vehicle has been operating on one fuel blend, the fuel tank is nearly empty, and a fuel blend having a very different composition than the previous blend is added, the composition of the fuel in the fuel tank will mix to form a fuel having a composition close to that of the added blend. When the engine is started, the fuel system (i.e. fuel lines, fuel pump, fuel filter, etc.) will initially be full of the previous blend. After a short time, the new blend will enter the fuel system from the fuel tank, causing the rate of composition change of the fuel reaching the engine to temporarily be much higher than is controllable by the engine control system.

When the rate of fuel composition change is high, particularly after phase separation or fuel blend change on an empty tank, engine control systems utilizing an engine control computer/fuel sensor arrangement are unable to keep up with the changing composition. This is due, in part, to the distance separating the fuel sensor and the engine. When the fuel composition is changing rapidly, the fuel composition information being sent to the engine control computer, based on the instantaneous composition of fuel flowing past the sensor, will differ from the composition of fuel actually being introduced into the engine. The result will be improper engine adjustments being made by the engine control computer, resulting in poor engine performance and excess emissions.

Accordingly, it is seen that a need exists in the art for a means of controlling the rate of composition change of a fluid having a changing composition, particularly when that fluid is a fuel in an alternative fuel vehicle.

SUMMARY OF THE INVENTION

That need is met by the present invention which provides a reservoir in which fluid entering the reservoir is mixed with fluid already present in the reservoir. The mixed fluid is then drawn from the reservoir in such a manner that the fluid drawn from the reservoir has a composition which closely approximates the average composition of the fluid in the reservoir. In this manner, the rate of composition change of fluid released from the reservoir is less than the composition change rate of fluid entering the reservoir. When used in the fuel line of alternative fuel vehicles, the present invention enables engine control systems to better control engine performance, particularly following periods of phase separation or fuel blend change on an empty tank.

In accordance with one aspect of the present invention, an apparatus for controlling the rate of composition change of a fluid having a varying composition is provided and comprises a reservoir having a top, bottom, and side wall to define an internal volume. The reservoir includes means for receiving a flowing fluid, and is adapted to retain a predetermined quantity of the fluid within the internal volume. Also included are means for mixing the fluid received by the reservoir with the fluid retained in the reservoir, and means for drawing a portion of the fluid retained in the reservoir such that the composition of the fluid drawn from the reservoir is representative of the instantaneous average composition of the fluid retained in the reservoir. The invention further includes means for releasing the fluid drawn from the reservoir to a downstream destination. In this manner, the composition of the fluid released from the reservoir varies at a rate which is less than the rate of compositional change of the fluid received by the reservoir.

Accordingly, it is a feature of the present invention to provide an apparatus and method for controlling the rate of composition change of a fluid having a changing composition.

It is a further feature to provide an apparatus and method for controlling the rate of composition change of fuel in alternative fuel vehicles.

These and other features and advantages of the present invention will become apparent from the following detailed description, the accompanying drawings, and the appended claims.

DESCRIPTION OF THE PREFERRED EMBODIMENT

Figure 1:
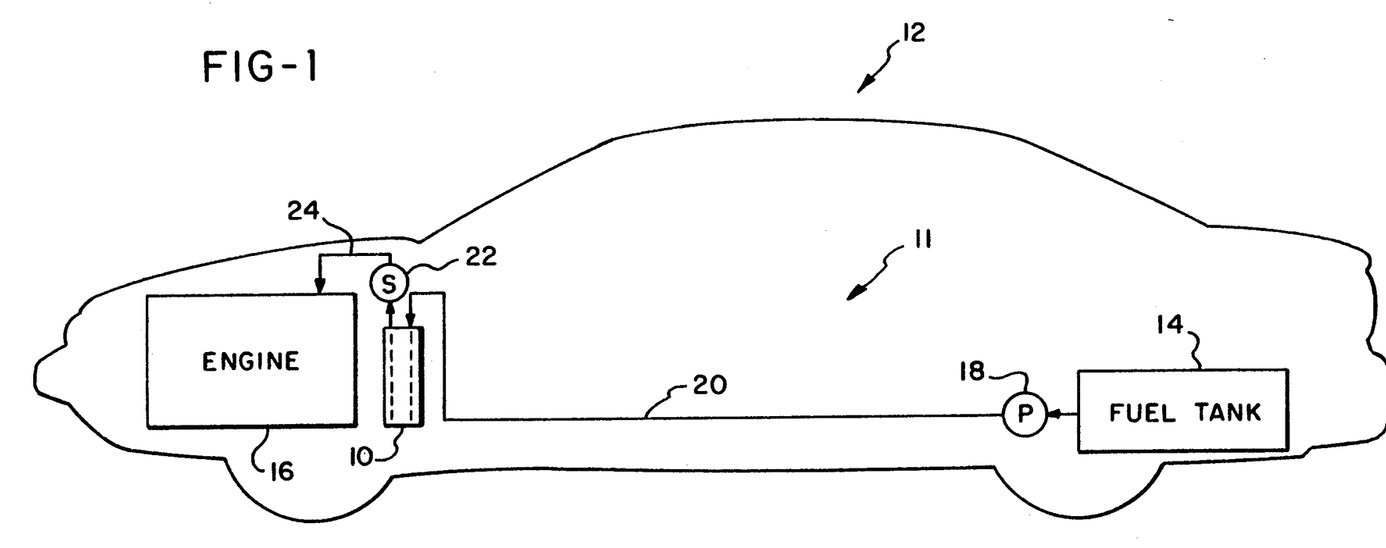
FIG. 1 is a schematic view of an automotive vehicle having an apparatus for controlling the rate of composition change of a fluid as provided by the present invention.

Referring to FIG. 1, apparatus 10 for controlling the rate of composition change of a fluid having a varying composition (hereinafter referred to as "composition change control apparatus 10") is shown schematically in a preferred location in the fuel system 11 of vehicle 12. Fuel system 11 includes fuel tank 14, fuel pump 18, upstream fuel line 20, fuel sensor 22, and downstream fuel line 24. As will be explained in greater detail below, composition change control apparatus 10 controls the rate of composition change of fuel flowing through fuel system 11. More specifically, composition change control apparatus 10 slows the rate of composition change of the fuel as it flows through fuel system 11.

While the present invention is being described in the context of a motor vehicle with fuel flowing therethrough, it will be readily apparent to those skilled in the art that the composition change control apparatus of the present invention is equally applicable to any system of fluid flow in which the fluid has a varying composition such that it is desired to control the rate of composition change of the fluid. Thus, the present invention is capable of use with a variety of fluids such as aqueous solutions or emulsions containing components which are miscible or immiscible in each other, oily mixtures, or mixtures of various hydrocarbons which are miscible or immiscible in each other. For purposes of illustration, the fluid with which composition change control apparatus 10 is presently being described is fuel. The fuel comprises multiple components, such as combinations of gasoline, methanol and ethanol. In addition, the fuel may also contain various fuel additives or water. The fuel thus contains two immiscible phases. One phase is gasoline rich while the other phase is methanol/ethanol/water rich. Fuel additives may be miscible in both phases. When phase separation occurs, the gasoline rich phase resides on top while the methanol/ethanol/water rich phase resides on the bottom.

Fuel system 11 operates as follows. Fuel from fuel tank 14 flows by force of fuel pump 18 through upstream fuel line 20, through composition change control apparatus 10, through fuel sensor 22 positioned in downstream fuel line 24, and into engine 16. Preferably, fuel sensor 22 is placed on the downstream side (i.e. on downstream fuel line 24) of composition change control apparatus 10 and as close to engine 16 as possible. As will be explained below, the composition of fuel flowing out of composition change control apparatus 10 varies at a rate which is less than the rate at which the composition of fuel received by composition change control apparatus 10 is changing. Thus, by placing fuel sensor 22 on the downstream side of composition change control apparatus 10 and as near engine 16 as possible, the fuel composition information sent by fuel sensor 22 to the engine control computer (not shown) of vehicle 12 will be very close to the actual composition of fuel entering engine 16. In this manner, the engine control parameters set by the engine control computer of vehicle 12 will be more accurate than a fuel system not having the composition change control apparatus of the present invention.

Figure 2:
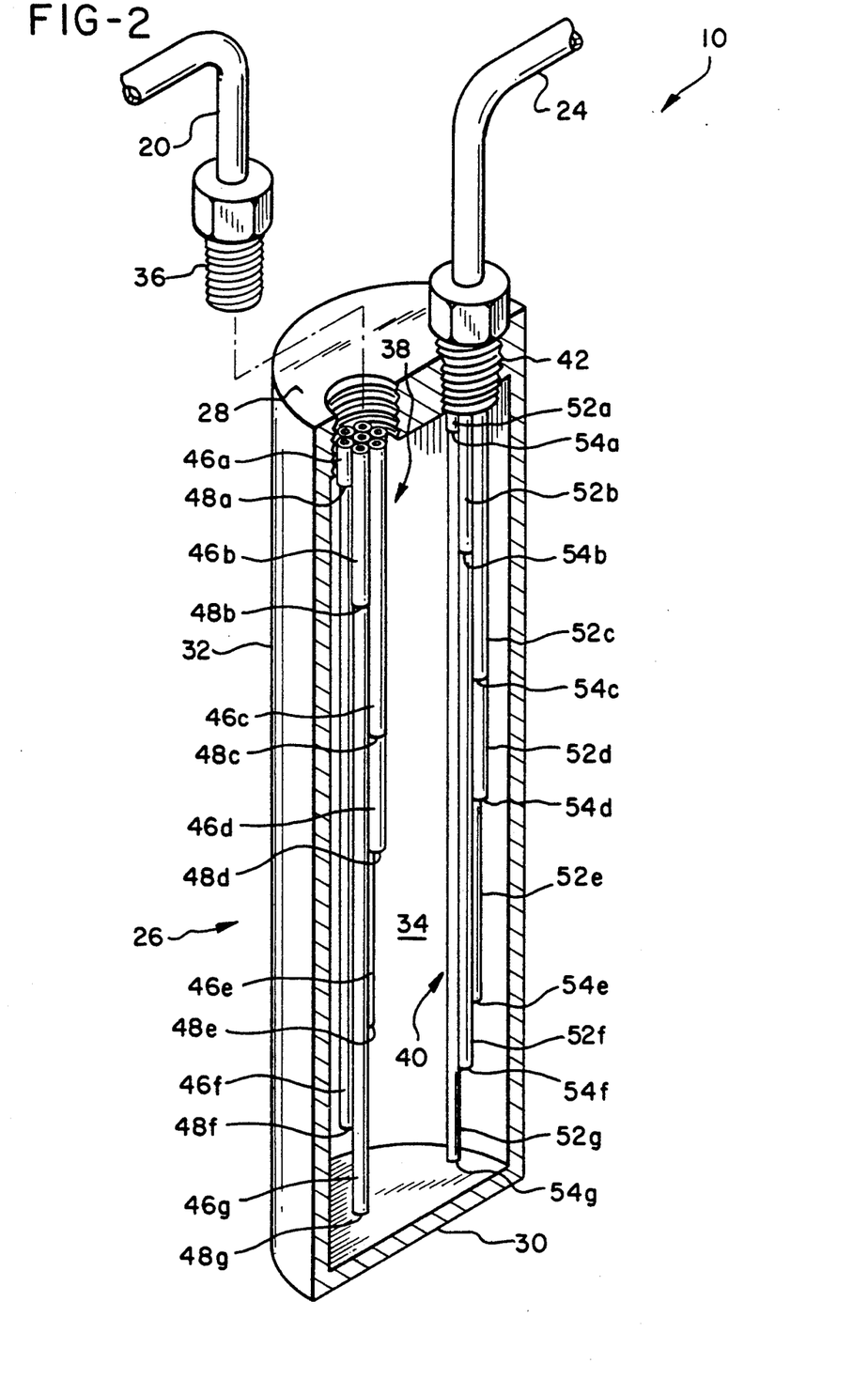
FIG. 2 is a rear fragmentary cut away perspective view of the apparatus for controlling the rate of composition change of a fluid, shown schematically in FIG. 1.

Referring now to FIG. 2, composition change control apparatus 10 is shown in greater detail, and includes reservoir 26 having a top 28, bottom 30, and side wall 32 to define an internal volume 34. Reservoir 26 is adapted to retain a predetermined quantity of fuel within its interval volume. This predetermined quantity, based upon the volumetric size of internal volume 34, is dependent upon the extent to which the rate of composition change of the fuel flowing therethrough is to be controlled. The higher the desired degree of control over the composition rate change (i.e., the slower the rate of composition change which is needed for a particular application), the larger the volumetric size of internal volume 34 is made. For example, it has been found that for a fuel system having a fuel pump capable of pumping fuel at 90 liters per hour, a reservoir having an internal volume sized to retain a quantity of 0.25 liters of fuel is sufficient (when coupled with sufficient mixing means, drawing means, and other features, as will be explained below) to adequately control the rate of composition change of a fuel containing components commonly used in alternative fuel vehicles. Although shown as a cylinder, reservoir 26 can be formed in any desired shape and constructed from any rigid, fuel-impervious material.

Reservoir 26 includes means 36, such as a threaded connector, for receiving fuel (or any fluid, as stated above) when fuel flows through upstream fuel line 20. Specifically, receiving means 36 is fluidly connected with upstream fuel line 20 such that fuel flows into receiving means 36 from upstream fuel line 20 when fuel pump 18 pumps fuel from fuel tank 14.

Composition change control apparatus 10 further includes means 38 for mixing fuel received by receiving means 36 with fuel retained in reservoir 26. Also included is means 40 for drawing a portion of the fuel retained in reservoir 26 such that the composition of the fuel drawn from reservoir 26 is representative of the instantaneous average composition of the fuel retained in reservoir 26. By "instantaneous average composition," we mean that the fuel drawn from reservoir 26 at a particular instant of time is approximately equal to the average composition of all of the fuel contained therein at that instant. In this manner, the composition of the fuel released from reservoir 26 varies at a rate which is less than the rate of change of the composition of the fuel received by reservoir 26.

Drawing means 40 draws fuel from reservoir 26 when fuel is made to flow therethrough by fuel pump 18. Thus, fuel pump 18 "pushes" the fuel into drawing means 40. Composition change control apparatus 10 additionally includes means 42, such as a threaded connector, for releasing the fuel drawn from reservoir 26 to a downstream destination (i.e. to engine 16 via downstream fuel line 24).

Referring now to FIGS. 2-6, composition change control apparatus 10 will be described with more particularity. Preferably, receiving means 36 includes inlet chamber 44, which is in fluid communication with fuel from fuel tank 14 via upstream fuel line 20. Inlet chamber 44 receives fuel from upstream fuel line 20 and introduces the fuel into reservoir 26.

Figure 3:
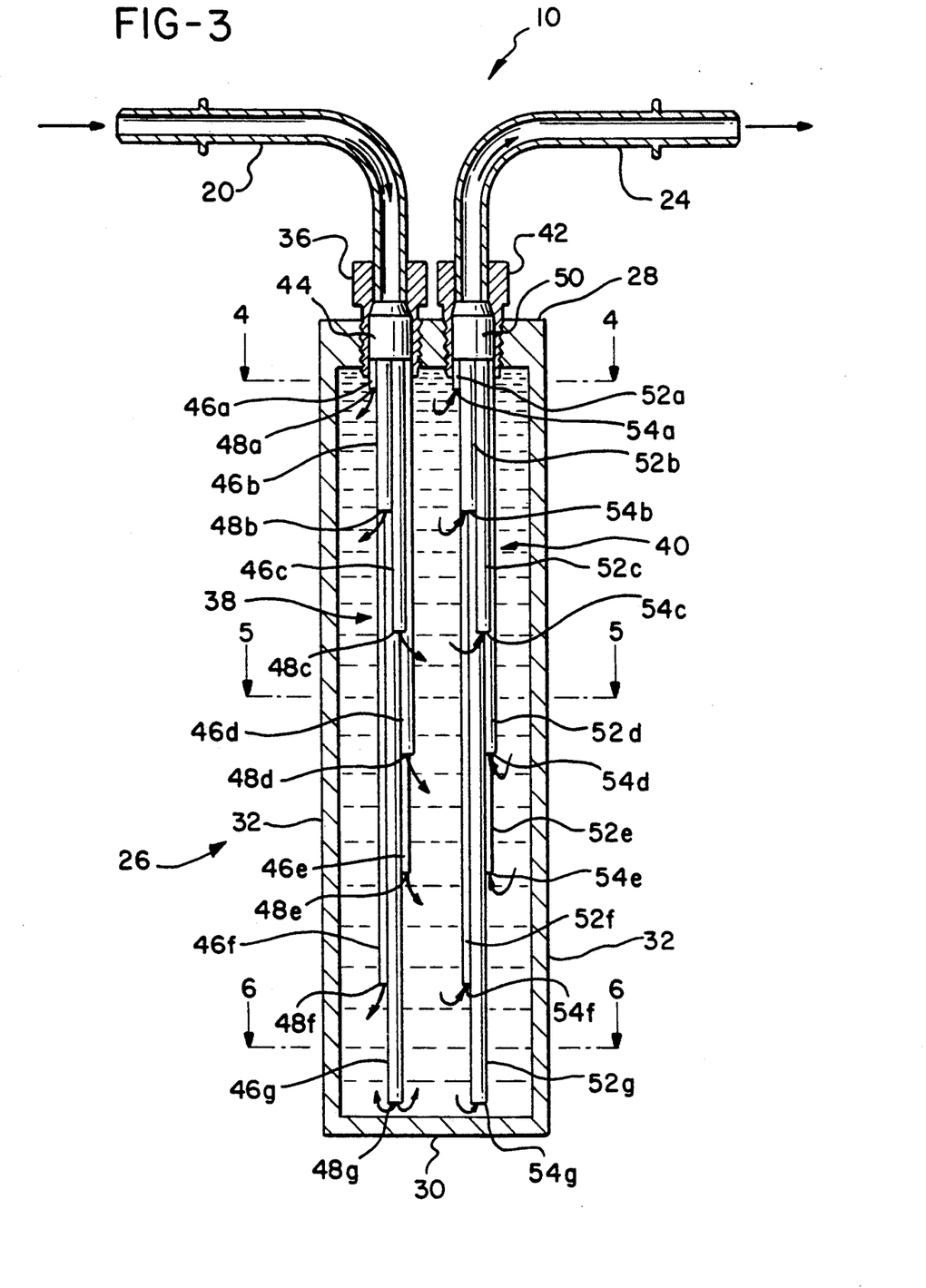
FIG. 3 is a front elevational view in section of the apparatus for controlling the rate of composition change of a fluid, shown in FIG. 2.
Figures 4, 5, 6:
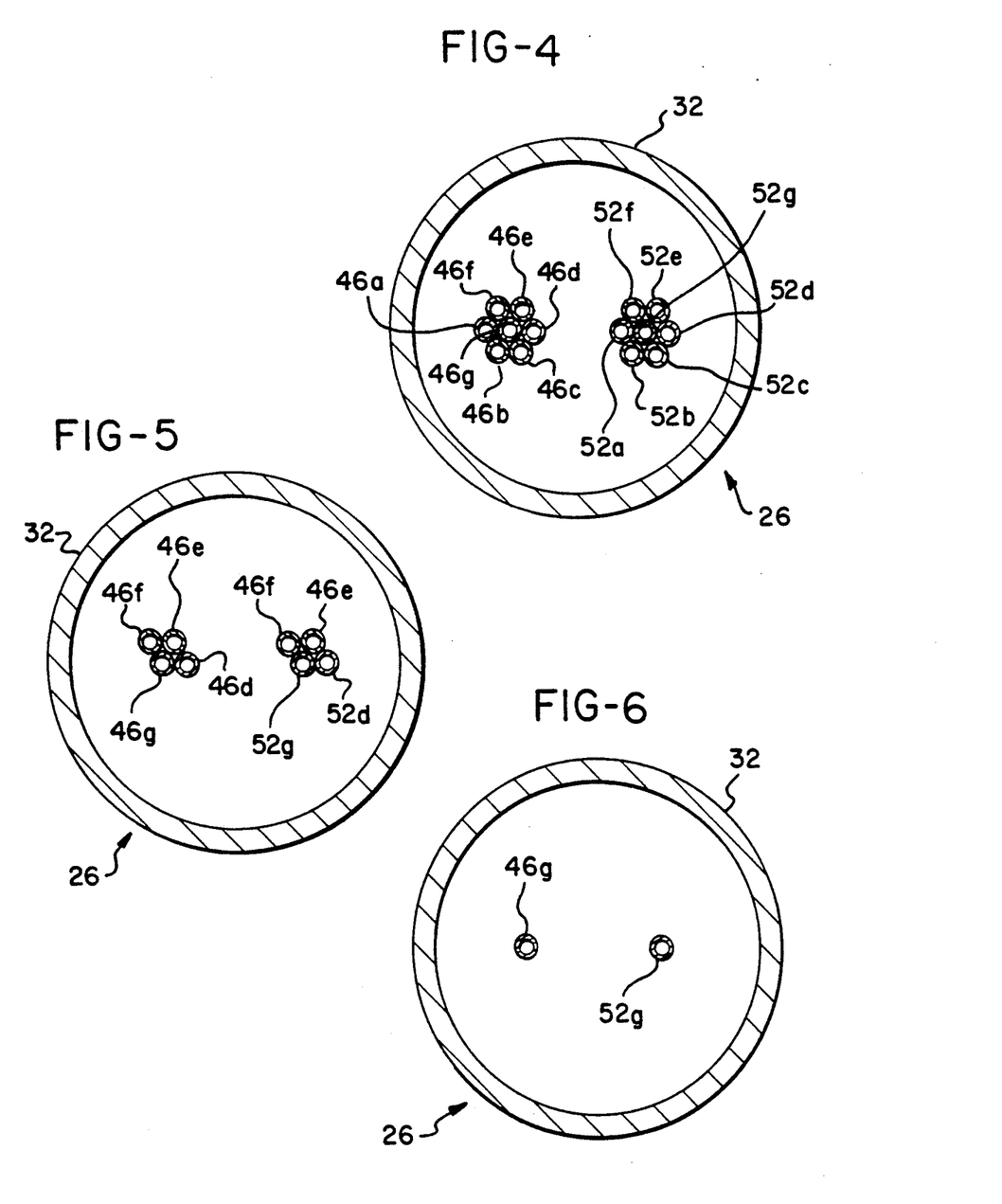
FIG. 4 is a cross-sectional view taken along line 4—4 in FIG. 3.
FIG. 5 is a cross-sectional view taken along line 5—5 in FIG. 3.
FIG. 6 is a cross-sectional view taken along line 6—6 in FIG. 3.

Mixing means 38 preferably includes means for distributing the incoming fuel received from inlet chamber 44 in substantially equal amounts at a plurality of levels of a vertical cross section, shown in FIGS. 2 and 3, of internal volume 34 of reservoir 26. In this manner, the incoming fuel is thoroughly mixed at all levels with the fuel retained in reservoir 26. As illustrated, such distributing means includes a series of distribution tubes, 46a-g, the cross-sections of which are shown in FIGS. 4-6. Each of distribution tubes 46a-g has a first end in fluid communication with inlet chamber 44, and a second end, 48a-g, terminating at a different one of a plurality of levels of internal volume 34 of reservoir 26, as shown.

Preferably, mixing means 38 includes seven distribution tubes 46a-g having second ends 48a-g. Second end 48a terminates near the top 28 of reservoir 26 while second end 48g terminates near the bottom 30 of reservoir 26. Second ends 48b-f terminate at levels which fall in between those of 48a and 48g. It has been found that seven distribution tubes, when combined with a reservoir capable of retaining a sufficient quantity of fluid, as discussed above, and with a suitable drawing means, as will be discussed below, provides composition change control apparatus 10 with sufficient mixing capability to control the rate of composition change of a typical gasoline/methanol/ethanol/water alternative fuel mixture flowing through the fuel system of an automotive vehicle within permissible limits for an engine control system. More specifically, composition change control apparatus 10 is capable of controlling the rate of composition change of such an alternative fuel mixture such that the rate of change of alcohol content of the fuel is less than 4% per second. This rate of change is sufficiently slow as to allow most engine control systems to adequately control the performance of an engine running on such alternative fuel mixtures.

In terms of the operation of mixing means 38, receiving means 36 receives fuel in inlet chamber 44 from upstream fuel line 20 when fuel pump 18 is operating such that fuel is flowing through fuel system 11. Inlet chamber 44 acts as a manifold in that it directs the fuel received to distribution tubes 46a-g in substantially equal portions. The fuel then flows through each of distribution tubes 46a-g and exits at second ends 48a-g, thereby distributing the fuel in substantially equal amounts at a plurality of levels of a vertical cross section of reservoir 26, as shown in FIG. 3. In this manner, the fuel received by receiving means 36 is mixed with the fuel retained in reservoir 26.

Advantageously, mixing means 38 mixes incoming fuel with retained fuel effectively over a wide range of flow rates. It works particularly well at low flow rates as compared with other devices. It has the further advantage that there are no moving parts.

Releasing means 42 preferably includes outlet chamber 50 which is adapted to receive fuel drawn from reservoir 26 and to release that fuel to engine 16 by way of downstream fuel line 24. Outlet chamber 50 is thus in fluid communication with downstream fuel line 24 and with the fuel retained in reservoir 26.

Preferably, drawing means 40 includes means for taking up fuel retained in reservoir 26 in substantially equal amounts from a plurality of levels of a vertical cross section of internal volume 34 of reservoir 26. In this manner, the composition of fuel drawn from reservoir 26 is representative of the instantaneous average composition of all of the fuel retained in reservoir 26. As illustrated, such take-up means include a series of take-up tubes, 52a-g, the cross-sections of which are shown in FIGS. 4-6. Each of take-up tubes 52a-g has a first end in fluid communication with outlet chamber 50, and a second end, 54a-g, terminating at a different one of a plurality of levels of internal volume 34 of reservoir 26, as shown.

Preferably, drawing means 40 includes seven take-up tubes 52a-g having second ends 54a-g. Second end 54a terminates near the top 28 of reservoir 26 while second end 54g terminates near the bottom 30 of reservoir 26. Second ends 54b-f terminate at levels which fall in between those of 54a and 54g. It has been found that seven take-up tubes, when combined with a reservoir capable of retaining a sufficient quantity of fluid, as discussed above, and with a suitable mixing means, as also discussed above, provides composition change control apparatus 10 with sufficient averaging capability to control the rate of composition change of a typical alternative fuel mixture flowing through the fuel system of a vehicle within permissible limits (i.e. such that the rate of change of alcohol content is less than 4% per second).

As fuel is pumped through reservoir 26 by fuel pump 18 and mixed with the fuel retained in reservoir 26 by mixing means 38, fuel is also drawn from the fuel retained in reservoir 26 by drawing means 40. Specifically, fuel flows into each of take-up tubes 52a-g, through second ends 54a-g, and into outlet chamber 50, thereby drawing fuel from reservoir 26 in substantially equal amounts from a plurality of levels of a vertical cross section of reservoir 26, as shown in FIG. 3. In this manner, the composition of fuel drawn from reservoir 26 is representative of the instantaneous average composition of the fuel retained in reservoir 26. The fuel drawn from reservoir 26 is then released by releasing means 42 to engine 16 via downstream fuel line 24.

Advantageously, composition change control apparatus 10 traps all immiscible phases of the fuel in reservoir 26 when fuel pump 18 ceases pumping such that the fuel retained within reservoir 26 becomes stationary. This feature is provided by positioning both inlet chamber 44 and outlet chamber 50 at the top 28 of reservoir 26. When fuel pump 18 ceases pumping and the fuel retained within reservoir 26 becomes stationary, if phase separation of the fuel in the entire fuel system 11 occurs, phase separation of the fuel retained within reservoir 26 will also occur. Due to the fact that the fuel retained in reservoir 26 had been well mixed by mixing means 38 while fuel was flowing through reservoir 26, all phases of the fuel will be represented in reservoir 26 in approximately the same proportions as the engine was consuming just prior to stopping the fuel pump. Furthermore, by placing both inlet chamber 44 and outlet chamber 50 at the top 28 of reservoir 26, the lower density phase (i.e. the gasoline rich phase) will not be able to escape out of reservoir 26 to accumulate in the high spots of fuel system 11. Similarly, the higher density phase (i.e. the methanol/ethanol/water rich phase) will not be able to escape reservoir 26 to settle in the low spots of fuel system 11. Instead, these immiscible phases are trapped within reservoir 26.

Subsequently, when engine 16 is started so that fuel pump 18 begins pumping fuel through fuel system 11, drawing means 40 will begin taking up the fuel retained in reservoir 26 in substantially equal amounts from a plurality of levels of internal volume 34 by way of take-up tubes 52a-g. As a result, the fuel drawn from the fuel retained in reservoir 26 is representative of the instantaneous average composition of all trapped immiscible phases thereof. In this manner, the rate of composition change of the fuel released from reservoir 26 will be slowed.

As can be seen, composition change control apparatus 10 acts as a buffer to slow the rate of composition change of fuel flowing therethrough by mixing fuel from fuel tank 14 with fuel retained in reservoir 26 and then continuously drawing a representative average of this mixed fuel and releasing it to engine 16. As mentioned, the parameters of the present invention which can be varied to control the rate of composition change of fluid flowing therethrough include the quantity of fluid which can be retained by reservoir 26, the number of distribution tubes 46a-g, and the number of take-up tubes 52a-g. Generally, the greater the quantity of fluid retained in reservoir 26 and the greater the number of distribution and take-up tubes 46a-g and 52a-g, the slower will be the rate of composition change of a fluid flowing through composition change control apparatus 10. These parameters can be adjusted as needed to attain the desired degree of control for each application in which composition change control apparatus 10 is utilized.

Advantageously, composition change control apparatus 10 provides a low pressure drop to fuel flowing therethrough. This feature allows the rate of composition change of fuel flowing through fuel system 11 to be controlled without significant additional load being placed upon fuel pump 18. Moreover, composition change control apparatus 10 contains no moving parts and is thus simple and reliable.

While representative embodiments and certain details have been shown for purposes of illustrating the invention, it will be apparent to those skilled in the art that various changes in the methods and apparatus disclosed herein may be made without departing from the scope of the invention, which is defined in the appended claims.

What is claimed is:

1. An apparatus for controlling the rate of composition change of a fluid having a varying composition, comprising:

a reservoir having a top, bottom, and side wall to define an internal volume, said reservoir having means for receiving said fluid when said fluid flows and being adapted to retain a predetermined quantity of said fluid within said internal volume;

means for mixing said fluid received by said reservoir with said fluid retained in said reservoir, said mixing means comprising means for distributing said fluid in substantially equal amounts of a plurality of levels of a vertical cross section of said internal volume of said reservoir such that said fluid is mixed with said fluid retained in said reservoir;

means for drawing a portion of said fluid retained in said reservoir when said fluid flows such that the composition of said fluid drawn from said reservoir is representative of the instantaneous average composition of said fluid retained in said reservoir; and means for releasing said fluid drawn from said reservoir to a downstream destination;

whereby, the composition of said fluid released from said reservoir varies at a rate which is less than the rate of compositional change of said fluid received by said reservoir.

2. A method of controlling the rate of composition change of a fluid having a varying composition, comprising the steps of:

introducing said fluid into a reservoir when said fluid flows, said reservoir retaining a predetermined quantity of fluid previously introduced therein;

distributing said fluid in substantially equal amounts at a plurality of levels of a vertical cross section of said reservoir such that said fluid is mixed with said fluid retained in said reservoir;

drawing fluid from said reservoir in substantially equal amounts from a plurality of levels of a vertical cross section of said reservoir such that the composition of said fluid drawn from said reservoir is representative of the instantaneous average composition of said fluid retained in said reservoir; and releasing said fluid drawn from said reservoir to a downstream destination;

whereby, the composition of said drawn fluid released from said reservoir varies at a rate which is less than the rate of compositional change of said fluid introduced into said reservoir.

3. An apparatus for controlling the rate of composition change of a fuel in an automotive vehicle, said vehicle having a fuel tank, an engine, and a fuel line supplying fuel to said engine from said fuel tank, said apparatus positioned between said fuel tank and said engine and comprising:

a reservoir having a top, bottom, and side wall to define an internal volume and an inlet chamber in fluid communication with said fuel from said fuel tank, said inlet chamber being adapted to receive said fuel when said fuel flows from said fuel tank and to introduce said fuel into said reservoir, said reservoir retaining a predetermined quantity of said fuel within said internal volume;

means for distributing said fuel from said inlet chamber in substantially equal amounts at a plurality of levels of a vertical cross section of said internal volume of said reservoir such that said fuel is mixed with said fuel retained in said reservoir, said distributing means including a series of tubes, each of said tubes having a first end in fluid communication with said inlet chamber and a second end terminating at a different one of said plurality of levels in said reservoir;

an outlet chamber to receive said fuel drawn from said reservoir and to release said fuel to said engine; and means for drawing fuel from said reservoir in substantially equal amounts from a plurality of levels of a vertical cross section of said internal volume of said reservoir such that the composition of said drawn fuel is representative of instantaneous average composition of said fuel retained in said reservoir, said drawing means adapted to transfer said fuel to said outlet chamber and including a series of tubes, each of said tubes having a first end in fluid communication with said outlet chamber and a second end terminating at a different one of said plurality of levels in said reservoir;

whereby, the composition of said fuel drawn from said reservoir varies at a rate which is less than the rate of compositional change of said fuel received by said reservoir.

4. An apparatus for controlling the rate of composition change of fuel having a varying composition in an automotive vehicle having an engine, comprising:

a fuel tank and a fuel line to supply said fuel to said engine;

a reservoir in fluid communication with said fuel line and positioned between said fuel tank and said engine and having a top, bottom, and side wall to define an internal volume, said reservoir having means for receiving said fluid when said fluid flows and being adapted to retain a predetermined quantity of said fluid within said internal volume, said receiving means comprising an inlet chamber in fluid communication with said fuel from said fuel line, said inlet chamber being adapted to receive said fuel when said fuel flows from said fuel tank and to introduce said fuel into said reservoir;

means for mixing said fluid received by said reservoir with said fluid retained in said reservoir;

means for drawing a portion of said fluid retained in said reservoir when said fluid flows such that the composition of said fluid drawn from said reservoir is representative of the instantaneous average composition of said fluid retained in said reservoir; and means for releasing said fluid drawn from said reservoir to a downstream destination;

whereby, the composition of said fluid released from said reservoir varies at a rate which is less than the rate of compositional change of said fluid received by said reservoir.

5. The apparatus of claim 1 wherein said receiving means comprises an inlet chamber in fluid communication with said fluid, said inlet chamber being adapted to receive said fluid and introduce said fluid into said reservoir.

6. The apparatus of claim 1 wherein said distributing means comprises a series of tubes, each of said tubes having a first end in fluid communication with said inlet chamber and a second end terminating at a different one of said plurality of levels of said internal volume of said reservoir.

7. The apparatus of claim 1 wherein said releasing means comprises an outlet chamber adapted to receive said fluid drawn from said reservoir and to release said fluid to a downstream destination.

8. The apparatus of claim 7 wherein said drawing means comprises means for taking up said fluid retained in said reservoir in substantially equal amounts from a plurality of levels of a vertical cross section of said internal volume of said reservoir such that the composition of said fluid drawn from said reservoir is representative of the instantaneous average composition of said fluid retained in said reservoir.

9. The apparatus of claim 8 wherein said take-up means comprises a series of tubes, each of said tubes having a first end in fluid communication with said outlet chamber and a second end terminating at a different one of said plurality of levels of said interval volume of said reservoir.

10. The apparatus of claim I wherein:

said receiving means comprises an inlet chamber in fluid communication with said fluid, said inlet chamber being adapted to receive said fluid and introduce said fluid into said reservoir;

said releasing means comprises an outlet chamber adapted to receive said fluid drawn from said reservoir and to release said fluid to a downstream destination; and said inlet chamber and said outlet chamber are positioned at said top of said reservoir so that all immiscible phases of said fluid are trapped within said reservoir when said fluid ceases flowing such that said fluid retained in said reservoir is stationary;

whereby, when said fluid resumes flowing, said fluid drawn from said fluid retained in said reservoir is representative of the instantaneous average composition of all immiscible phases of said fluid trapped within said reservoir to thereby slow the rate of composition change of said fluid released from said reservoir.

11. The apparatus of claim 4 wherein said mixing means comprises means for distributing said fuel in substantially equal amounts at a plurality of levels of a vertical cross section of said internal volume of said reservoir such that said fuel is mixed with said fuel retained in said reservoir.

12. The apparatus of claim 11 wherein said distributing means comprises a series of tubes, each of said tubes having a first end in fuel communication with said inlet chamber and a second end terminating at a different one of said plurality of levels of said internal volume of said reservoir.

13. The apparatus of claim 12 wherein said distributing means includes seven tubes.

14. The apparatus of claim 4 wherein said releasing means comprises an outlet chamber adapted to receive said fuel drawn from said reservoir and to release said fuel to said engine.

15. The apparatus of claim 14 wherein said drawing means comprises means for taking up said fuel retained in said reservoir in substantially equal amounts from a plurality of levels of a vertical cross section of said internal volume of said reservoir such that the composition of said drawn from said reservoir is representative of the instantaneous average composition of said fuel retained in said reservoir.

16. The apparatus of claim 15 wherein said take-up means comprises a series of tubes, each of said tubes having a first end in fuel communication with said outlet chamber and a second end terminating at a different one of said plurality of levels of said interval volume of said reservoir.

17. The apparatus of claim 16 wherein said take-up means includes seven tubes.

18. The apparatus of claim 4 wherein:

said receiving means comprises an inlet chamber in fluid communication with said fuel from said fuel tank, said inlet chamber being adapted to receive said fuel when said fuel flows from said fuel tank and to introduce said fuel into said reservoir;

said releasing means comprises an outlet chamber adapted to receive said fuel drawn from said reservoir and to release said fuel to said engine; and said inlet chamber and said outlet chamber are positioned at said top of said reservoir so that all immiscible phases of said fuel are trapped within said reservoir when said fuel ceases flowing such that said fuel retained in said reservoir is stationary;

whereby, when said fuel resumes flowing, said fuel drawn from said fuel retained in said reservoir is representative of the instantaneous average composition of all immiscible phases of said fuel trapped within said reservoir to thereby slow the rate of composition change of said fuel released from said reservoir.

* * * * *